US010499226B2

(12) United States Patent
Radmand

(10) Patent No.: US 10,499,226 B2
(45) Date of Patent: Dec. 3, 2019

(54) METHOD AND APPARATUS FOR COMPATIBLE COMMUNICATION BETWEEN ACCESS POINTS IN A 6LOWPAN NETWORK

(71) Applicant: Dell Products, LP, Round Rock, TX (US)

(72) Inventor: Pedram Radmand, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 88 days.

(21) Appl. No.: 15/642,369

(22) Filed: Jul. 6, 2017

(65) Prior Publication Data

US 2019/0014436 A1 Jan. 10, 2019

(51) Int. Cl.
| | |
|---|---|
| *H04L 12/28* | (2006.01) |
| *H04W 4/80* | (2018.01) |
| *H04W 4/70* | (2018.01) |
| *H04W 40/02* | (2009.01) |
| *H04W 84/12* | (2009.01) |
| *H04W 84/18* | (2009.01) |

(52) U.S. Cl.
CPC ............ *H04W 4/80* (2018.02); *H04L 12/28* (2013.01); *H04W 4/70* (2018.02); *H04W 40/02* (2013.01); *H04W 84/12* (2013.01); *H04W 84/18* (2013.01)

(58) Field of Classification Search
None
See application file for complete search history.

(56) References Cited

U.S. PATENT DOCUMENTS

| | | |
|---|---|---|
| 6,954,616 B2 | 10/2005 | Liang |
| 9,549,049 B2 | 1/2017 | Lim |
| | (Continued) | |

FOREIGN PATENT DOCUMENTS

| | | | | |
|---|---|---|---|---|
| WO | WO-2011119019 A1 * | 9/2011 | ........... | H04L 61/106 |
| WO | 2015193849 A1 | 12/2015 | | |

OTHER PUBLICATIONS

Radmand, Pedram et al. "ZigBee/ZigBee PRO Security Assessment Based on Compromised Cryptographic Keys." 2010 International Conference on P2P, Parallel, Grid, Cloud and Internet Computing. Nov. 4-6, 2010. pp. 465-470.

*Primary Examiner* — Kwang B Yao
*Assistant Examiner* — Juvena W Loo
(74) *Attorney, Agent, or Firm* — Prol Intellectual Property Law, PLLC; H. Kenneth Prol

(57) ABSTRACT

A method and apparatus for a multi-compatible 6LoWPAN gateway system may include a main processor directing operation of a plurality of wireless adapters, each of the plurality of wireless adapters operably connected to one of a plurality of microcontroller processors, and each microcontroller processor executing code instructions of a real-time operating system. The main processor may route an incoming transmission to a first of the plurality of wireless adapters, and, upon notification from a first microcontroller processor operably connected to the first of the plurality of wireless adapters that the first wireless adapter did not receive the incoming transmission, or that the first real-time operating system did not process a data packet within the incoming transmission, may route the incoming transmission to a next wireless adapter operably connected to a next microcontroller processor until the data packet has been processed.

20 Claims, 4 Drawing Sheets

(56) References Cited

U.S. PATENT DOCUMENTS

| | | |
|---|---|---|
| 2013/0070745 A1 | 3/2013 | Nixon |
| 2014/0080528 A1 | 3/2014 | Lim |
| 2015/0244840 A1 | 8/2015 | Chakrabarti |
| 2016/0165439 A1* | 6/2016 | Chen .................... H04W 12/06 726/12 |
| 2016/0219615 A1* | 7/2016 | Chakrabarti ............ H04W 4/70 |
| 2017/0041231 A1* | 2/2017 | Seed ....................... H04W 4/70 |
| 2017/0180214 A1* | 6/2017 | Azevedo ............... H04L 41/147 |
| 2017/0230916 A1* | 8/2017 | Stein ........................ H02J 50/20 |
| 2017/0295210 A1* | 10/2017 | Choi ....................... H04L 51/04 |
| 2017/0374490 A1* | 12/2017 | Schoppmeier .......... H04L 67/12 |
| 2018/0007172 A1* | 1/2018 | Wang ...................... H04L 69/02 |
| 2018/0034914 A1* | 2/2018 | Christopher ............ H04L 69/08 |
| 2018/0063851 A1* | 3/2018 | Abraham ............... H04W 72/10 |
| 2018/0302440 A1* | 10/2018 | Hu .......................... H04L 63/20 |

* cited by examiner

METHOD AND APPARATUS FOR COMPATIBLE COMMUNICATION BETWEEN ACCESS POINTS IN A 6LOWPAN NETWORK

FIELD OF THE DISCLOSURE

The present disclosure generally relates to the field of communication of wireless access points according to the 6LoWPAN protocol, and more specifically to operation of devices, information handling systems, and access points within a 6LoWPAN network among a plurality of variations of the various protocols for transmission, network, transport, and application layers.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems.

The information handling system may include telecommunication, network communication, and video communication capabilities. Further, the information handling system may include utilization and communication with a 6LoW-PAN network such as used with lower power network applications such as internet of things (IoT) device networks.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
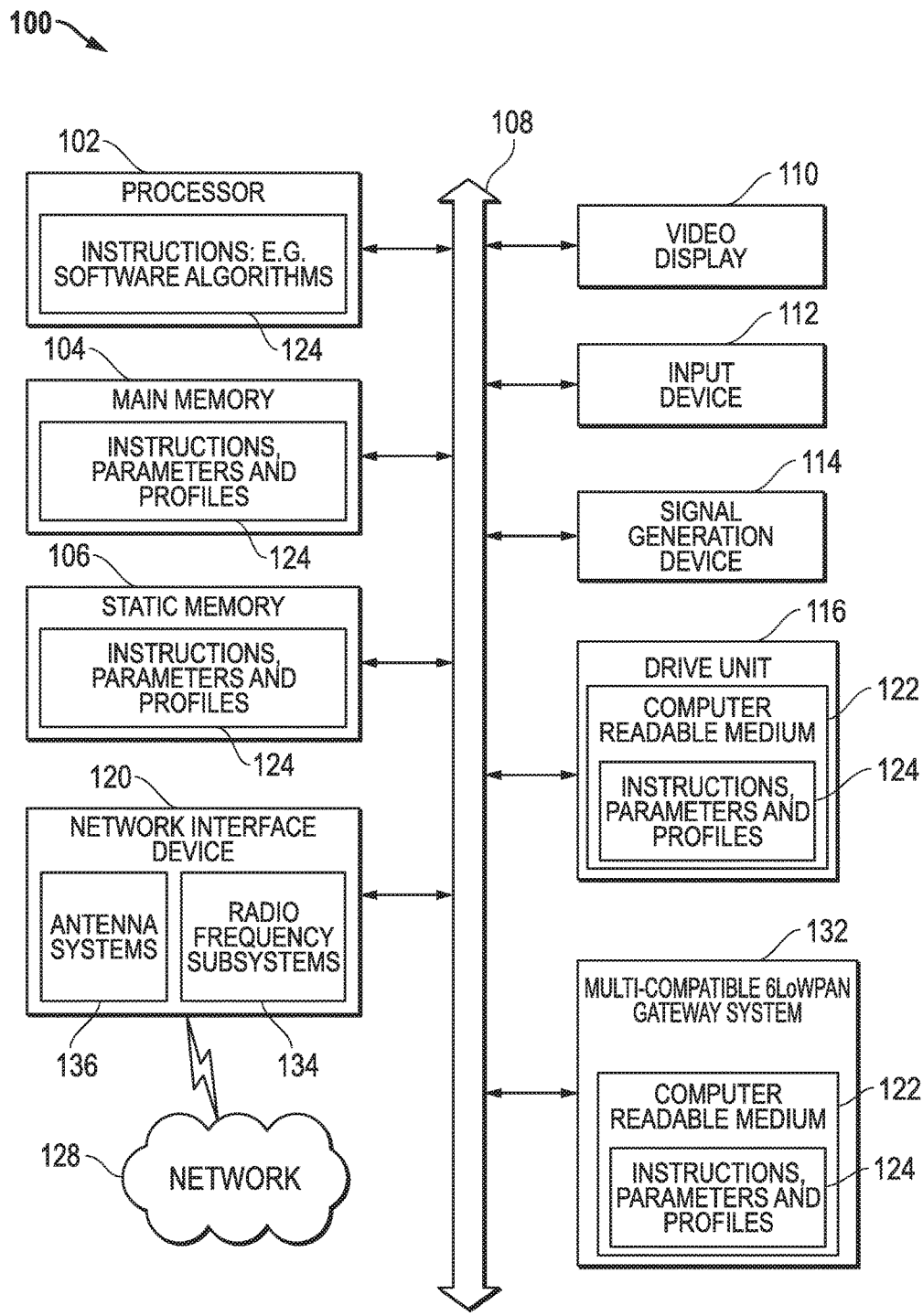
FIG. 1 is a block diagram illustrating an information handling system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Many small, low power devices operating within the Internet of Things (IoT) operate according to the IEEE standard 802.15.4, providing the fundamental lower network layers of a type of wireless personal area network (WPAN). The WPAN type served by the IEEE standard 802.15.4 provide low-cost, low-speed ubiquitous communication between devices, rather than the networks operating under the Wi-Fi standard which offer more bandwidth but require more power. The aim of the IEEE standard 802.15.4 is to lower power consumption by providing little to no underlying infrastructure. IEEE 802.15.4-conformant devices may currently use one of three frequency bands: 868-868.6 MHz, 902-928 MHz, and 2400-2483.5 MHz. Other frequency bands may be understood to be available as well.

By contrast, the Internet Protocol Version 6 (IPv6) internet protocol is geared more towards attaining high speeds, rather than lower power consumption rates. IPv6 includes a large address space that allows for $3.4 \times 10^{28}$ devices with different identifications to operate within the internet, increasing the size of packets transmitted over IPv6 networks. The format of an IPv6 data packet varies markedly from the format of an IEEE standard 802.15.4 data packet. Most Cloud computing resources (e.g. shared servers) communicate with devices and with one another according to the IPv6 standard. Thus, in order for devices operating within an IEEE 802.15.4 network to communicate data to the cloud, they must be capable of transmitting data packets that conform to the IPv6 standard.

The Internet Engineering Task Force (IETF) developed the IPv6 over Low Power Wireless Personal Area Networks (6LoWPAN) protocol in order to allow devices operating within an IEEE 802.15.4 network to transmit data packets that may be combined to create a data packet that conforms to the IPv6 standard. The header compression mechanisms standardized according to the 6LoWPAN protocol can be used to provide header compression of IPv6 packets to be transmitted over IEEE 802.15.4 networks.

Prior to the advent of the 6LoWPAN protocol, devices designed to work within an IEEE 802.15.4 network were not necessarily designed to be compatible with other devices operating within the 802.15.4 network but under normally incompatible variations of the same. For example, devices within one network may operate according to a different network layer protocol, different transport layer protocol, and different application layer protocol than devices within another variation of the low power network. In essence, each IEEE 802.15.4 network formed a distinct ecosystem of devices operating according to a very specific combination of protocols at various layers. In addition, prior to the advent of the 6LoWPAN protocol, wireless devices not designed for operation in the IEEE 802.15.4 network, but rather, designed for high-speed operation according to the Wi-Fi standard communicated according to the IPv6 protocol. Devices communicating according to the Wi-Fi standard most commonly transmit and receive data packets at the 2.4 GHz and 5 GHz radio frequencies, in contrast to the common IEEE 802.15.4 radio frequency bands of 868 MHz, 925 MHz, and 2.45 GHz. Thus, different frequencies and physical layers, including MCU architecture types, may be used among varied 6LoWPAN devices adding another dimension of non-compatibility.

With the advent of the 6LoWPAN protocol it became feasible to transmit data packets between Wi-Fi networks and IEEE 802.15.4 networks, allowing IEEE 802.15.4 network devices to access and utilize cloud-computing resources. However, compatibility between devices within different IEEE 802.15.4 networks, and compatibility between radio frequencies of IEEE 802.15.4 networks remains a problem. A solution is needed to create compatibility between devices within different IEEE 802.15.4 networks, and compatibility between radio frequencies of IEEE 802.15.4 networks.

Embodiments of the present disclosure provide for interoperability of access points within a 6LoWPAN network transmitting data packets modulated according to a plurality of modulation schemes on a plurality of radio frequencies and operating according to a plurality of network layer protocols, transmission layer protocols, and application layer protocols. Additionally, embodiments of the present disclosure solve these problems by providing a gateway wireless access point capable of receiving and transmitting data transmission packets on a plurality of radio frequencies from the bands used by the variations of IEEE 802.15.4 networks, demodulating data packets according to a plurality of modulation schemes, and processing data packets through a plurality of real-time operating systems running within a higher layer operating system within the gateway device. Each real-time operating system in embodiments of the present disclosure may be capable of saving to a common memory (accessible by each real-time operating system) within the gateway device data payloads encapsulated in received data packets. In addition, multiple real-time operating systems at multi-compatible 6LowPAN gateways in embodiments of the present disclosure may be capable of processing data packets generated according to each combination of a specific network protocol, a specific transport protocol, and a specific application protocol. In essence, the multi-compatible 6LowPAN gateway systems have real-time operating systems that may be capable of processing data payloads received from each of the distinct "eco-systems" as described above, and by saving the data payloads from each of these different eco-systems to a single memory, and repackaging the data payload for transmission to a different "ecosystem," the gateway wireless access point provides compatibility between the disparate IEEE 802.15.4 networks.

FIG. 1 illustrates an information handling system 100 similar to information handling systems according to several aspects of the present disclosure. In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer (e.g., personal digital assistant (PDA) or smart phone), tablet computer, mobile device (e.g., personal digital assistant (PDA) or smart phone), gateway, IoT device, wearable computing system, server (e.g., blade server or rack server), a consumer electronic device, a network server or storage device, a switch router, wireless router, or other network communication device, a network connected device (cellular telephone, tablet device, etc.), or any other suitable device, and can vary in size, shape, performance, price, and functionality. The information handling system can include memory (volatile (e.g. random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more disk drives, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

FIG. 1 shows an information handling system 100 capable of administering each of the specific embodiments of the present disclosure. For example, the information handling system 100 can represent a gateway device operating as wireless network access point located anywhere within a IEEE 802.15.4 network of access points. A gateway device may execute instructions 124 via a processor for a multi-compatible 6LowPAN gateway system 132 according to embodiments disclosed herein. The multi-compatible 6Low-PAN gateway system 132 of various embodiments of the present disclosure may operate in some example embodiments as a software agent, in whole or in part, within a gateway device or other wireless network access point while other portions of the multi-compatible 6LowPAN gateway system 132 may operate on remote server systems. Information handling system 100 may also represent a networked server or other system and administer some or all aspects of the multi-compatible 6LowPAN gateway system 132 via instructions 124 executed on a processor according to various embodiments herein involving remote operation of such systems.

For example, an information handling system 100 may be any mobile or other computing device capable of executing a set of instructions (sequential or otherwise) 124 that specify actions to be taken by that machine. In a particular embodiment, the information handling system 100 can be implemented using electronic devices that provide voice, video, or data communication. Further, while a single information handling system 100 is illustrated, the term "system" shall also be taken to include any collection of systems or sub-systems that individually or jointly execute a set, or multiple sets of instructions to perform one or more computer functions.

Information handling system 100 can include devices or modules that embody one or more of the devices or execute instructions for the one or more systems and modules described above, and operates to perform one or more of the methods described above. The information handling system 100 may execute code instructions 124 that may operate on servers or systems, remote data centers, or on-box in individual client information handling systems according to various embodiments herein. In some embodiments, it is understood any or all portions of code instructions 124 may operate on a plurality of information handling systems 100.

The information handling system 100 may include a processor 102 such as a central processing unit (CPU), control logic or some combination of the same. Any of the processing resources may operate to execute code that is either firmware or software code. Moreover, the information handling system 100 can include memory such as main memory 104, static memory 106, computer readable medium 122 storing instructions 124 of the multi-compatible 6LowPAN gateway system 132, and drive unit 116 (volatile (e.g. random-access memory, etc.), nonvolatile (read-only memory, flash memory etc.) or any combination thereof). The information handling system 100 can also include one or more buses 108 operable to transmit communications between the various hardware components such as any combination of various input and output (I/O) devices. Portions of an information handling system may themselves be considered information handling systems.

As shown, the information handling system 100 may further include a video display 110. The video display 110 in an embodiment may function as a liquid crystal display (LCD), an organic light emitting diode (OLED), a flat panel display, a solid state display, or other display systems. Additionally, the information handling system 100 may include an alpha numeric input device 112, such as a keyboard, and/or a cursor control device, such as a mouse, touchpad, or gesture or touch screen input.

The information handling system 100 can also include a disk drive unit 116, and a signal generation device 118, such as a speaker or remote control. The information handling system 100 can also represent a server device whose resources can be shared by multiple client devices, or it can represent an individual client device, such as a desktop personal computer, a laptop computer, a tablet computer, or a mobile smartphone.

Network interface device 120 represents a NIC disposed within information handling system 100, on a main circuit board of the information handling system, integrated onto another component such as processor 102, in another suitable location, or a combination thereof. The network interface device 120 can include another information handling system, a data storage system, another network, a grid management system, another suitable resource, or a combination thereof. Network interface device 120 in an embodiment may operably connect to a network 128. Connection to network 128 may be wired or wireless.

The network interface device shown as wireless adapter 120 can provide connectivity to a network 128, e.g., a wide area network (WAN), a local area network (LAN), wireless local area network (WLAN), a wireless personal area network (WPAN), a wireless wide area network (WWAN), or other network. Connectivity may be via wired or wireless connection. Wireless adapter 120 may include one or more radio frequency subsystems 134 with transmitter/receiver circuitry, wireless controller circuitry, amplifiers and other circuitry for wireless communications. Each radio frequency subsystem 134 may communicate with one or more wireless technology protocols including the variations of the 6LoW-PAN protocol and varied frequencies encountered by the adapter 120. The wireless adapter 120 may also include antenna system 136 which may be tunable antenna systems for use with the system and methods disclosed herein. In other aspects, the information handling system 100 operating as a wireless communication device may operate a plurality of wireless adapters 120 for concurrent radio operation in one or more wireless communication bands. Wireless adapters 120 may include radios, routing protocols, and application layer protocols as discussed further in embodiments herein.

The wireless network in which a gateway network access point operates may have a wireless mesh architecture or partial mesh architecture in accordance with mesh networks described by the wireless data communications standards or similar standards. This may include wireless ad hoc networked systems. The wireless adapter 120 may also connect to the external network and to mobile information handling systems via a WPAN, WLAN, WWAN or similar wireless switched Ethernet connection. The wireless adapter 120 may operate in accordance with any wireless data communication standards. To communicate with a wireless local area network, standards including IEEE 802.11 WLAN standards, IEEE 802.15 WPAN standards, WWAN such as 3GPP or 3GPP2, or similar wireless standards may be used. Wireless adapter 120 may connect to any combination of macro-cellular wireless connections including 2G, 2.5G, 3G, 4G, 5G or the like from one or more service providers. The wireless adapter 120 can represent an add-in card, wireless network interface module that is integrated with a main board of the information handling system or integrated with another wireless network interface capability, or any combination thereof.

In an embodiment the wireless adapter 120 may include one or more radio frequency subsystems 134 including transmitters and wireless controllers for connecting via a multitude of wireless links. In an example embodiment, an information handling system may have an antenna system transmitter 136 for 4G LTE and/or 5G small cell WWAN, Wi-Fi WLAN or WiGig connectivity and one or more additional antenna system transmitters 132 for macro-cellular communication. The radio frequency subsystems 134 include wireless controllers to manage authentication, connectivity, communications, power levels for transmission, buffering, error correction, baseband processing, and other functions of the wireless adapter 120.

The information handling system 100 can represent a server device whose resources can be shared by multiple client devices, or it can represent an individual client device, such as an IoT device, a desktop personal computer, a laptop computer, a tablet computer, or a mobile phone. In a networked deployment, the information handling system 100 may operate in the capacity of a server or as a client user computer in a server-client user network environment, or as a peer computer system in a peer-to-peer (or distributed) network environment.

The information handling system 100 can include a set of instructions 124 that can be executed to cause the computer system to perform any one or more of the methods or computer based functions disclosed herein. Wireless adapter 120 may also include one or more radio frequency subsystems 134 including transmitters and wireless controllers for connecting via a multitude of WPAN technologies. For example, instructions 124 may execute a multi-compatible 6LowPAN gateway system, software agents, or other aspects or components. Similarly instructions 124 may execute the multi-compatible 6LowPAN gateway system disclosed herein for receiving data packet transmissions on a plurality of radio frequencies, and for demodulating the received data packets according to a plurality of modulation schemes. Instructions 124 may also include aspects of the multi-compatible 6LowPAN gateway system to process the received and demodulated data packets within a plurality of real-time operating systems covering 6LoWPAN variations among a multitude of client low power systems such as IoT client devices. For example, the processor 102 may execute machine-readable code instructions of each real-time operating system in an embodiment to save to the common memory 102 (accessible by each real-time operating system) data payloads encapsulated in received and demodulated data packets. In addition, each real-time operating system in embodiments of the present disclosure may be capable of processing data packets generated according to one of a plurality of network protocols, one of a plurality of transport protocols, and one of a plurality of application protocols.

Various software modules comprising application instructions 124 may be coordinated by an operating system (OS) via an application programming interface (API). An example operating system may include Windows®, Android®, and other OS types known in the art. Example APIs may include Win 32, Core Java API, or Android APIs. Further, one or more real-time operating systems (RTOS) may operate on a platform such as a Linux kernel during implementation of embodiments herein. Example real-time operating systems may include operating systems designed for wireless access points operating within the IoT, including but not limited to Contiki, TinyOS, FreeRTOS executing OpenWSN, Zephyr, and mbed.

In a networked deployment, the information handling system 100 may operate in the capacity of a server or as a client user computer in a server-client user network environment, or as a peer computer system in a peer-to-peer (or distributed) network environment. The information handling system 100 can also be implemented as or incorporated into various devices, such as a personal computer (PC), a tablet PC, IoT computing devices, wearable computing devices, a set-top box (STB), a PDA, a mobile information handling system, a palmtop computer, a laptop computer, a desktop computer, a communications device, an access point (AP), a base station transceiver, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single information handling system 100 is illustrated, the term "system" shall also be taken to include any collection of systems or sub-systems that individually or jointly execute a set, or multiple sets, of instructions to perform one or more computer functions.

The disk drive unit 116 and the multi-compatible 6LowPAN gateway system 132 may include a computer-readable medium 122 in which one or more sets of instructions 124 such as software can be embedded. Similarly, main memory 104 and static memory 106 may also contain a computer-readable medium for storage of one or more sets of instructions, parameters, or profiles 124. The disk drive unit 116 and static memory 106 also contain space for data storage. Further, the instructions 124 may embody one or more of the methods or logic as described herein. For example, instructions relating to the multi-compatible 6LowPAN gateway system software algorithms may be stored here. In a particular embodiment, the instructions, parameters, and profiles 124 may reside completely, or at least partially, within the main memory 104, the static memory 106, and/or within the disk drive 116 during execution by the processor 102 of information handling system 100. As explained, some or all of the multi-compatible 6LowPAN gateway system may be executed locally or remotely. The main memory 104 and the processor 102 also may include computer-readable media.

Main memory 104 may contain computer-readable medium (not shown), such as RAM in an example embodiment. An example of main memory 104 includes random access memory (RAM) such as static RAM (SRAM), dynamic RAM (DRAM), non-volatile RAM (NV-RAM), or the like, read only memory (ROM), another type of memory, or a combination thereof. Static memory 106 may contain computer-readable medium (not shown), such as NOR or NAND flash memory in some example embodiments. The multi-compatible 6LowPAN gateway system 132 and the drive unit 116 may include a computer-readable medium 122 such as a magnetic disk in an example embodiment. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. Accordingly, the disclosure is considered to include any one or more of a computer-readable medium or a distribution medium and other equivalents and successor media, in which data or instructions may be stored.

The multi-compatible 6LowPAN gateway system 132 computer readable medium 122 may also contain space for data storage. The information handling system 100 may also include a multi-compatible 6LowPAN gateway system 132 that may be operably connected to the bus 108. The multi-compatible 6LowPAN gateway system 132 may perform tasks related to receiving data packet transmissions on a plurality of radio frequencies, demodulating the received data packets according to a plurality of modulation schemes, and executing machine-readable code instructions of each real-time operating system in an embodiment to save to the common memory 102 (accessible by each real-time operating system) data payloads encapsulated in received and demodulated data packets. In an embodiment, the multi-compatible 6LowPAN gateway system 132 may communicate with the main memory 104, the processor 102, the video display 110, the alpha-numeric input device 112, the signal generation device 114, and the network interface device 120 via bus 108, and several forms of communication may be used, including ACPI, SMBus, a 24 MHZ BFSK-coded transmission channel, or shared memory.

In other embodiments, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCM-CIA) card, or other such expansion card), or a system (such as a motherboard, a system-on-a-chip (SoC), or a stand-alone device). The system, device, controller, or module can include software, including firmware embedded at a device, such as an Intel® Core class processor, ARM® brand processors, Qualcomm® Snapdragon processors, or other processors and chipset, or other such device, or software capable of operating a relevant environment of the information handling system. The system, device, controller, or module can also include a combination of the foregoing examples of hardware or software. Note that an information handling system can include an integrated circuit or a board-level product having portions thereof that can also be any combination of hardware and software. Devices, modules, resources, controllers, or programs that are in communication with one another need not be in continuous communication with each other, unless expressly specified otherwise. In addition, devices, modules, resources, controllers, or programs that are in communication with one another can communicate directly or indirectly through one or more intermediaries.

Figure 2:
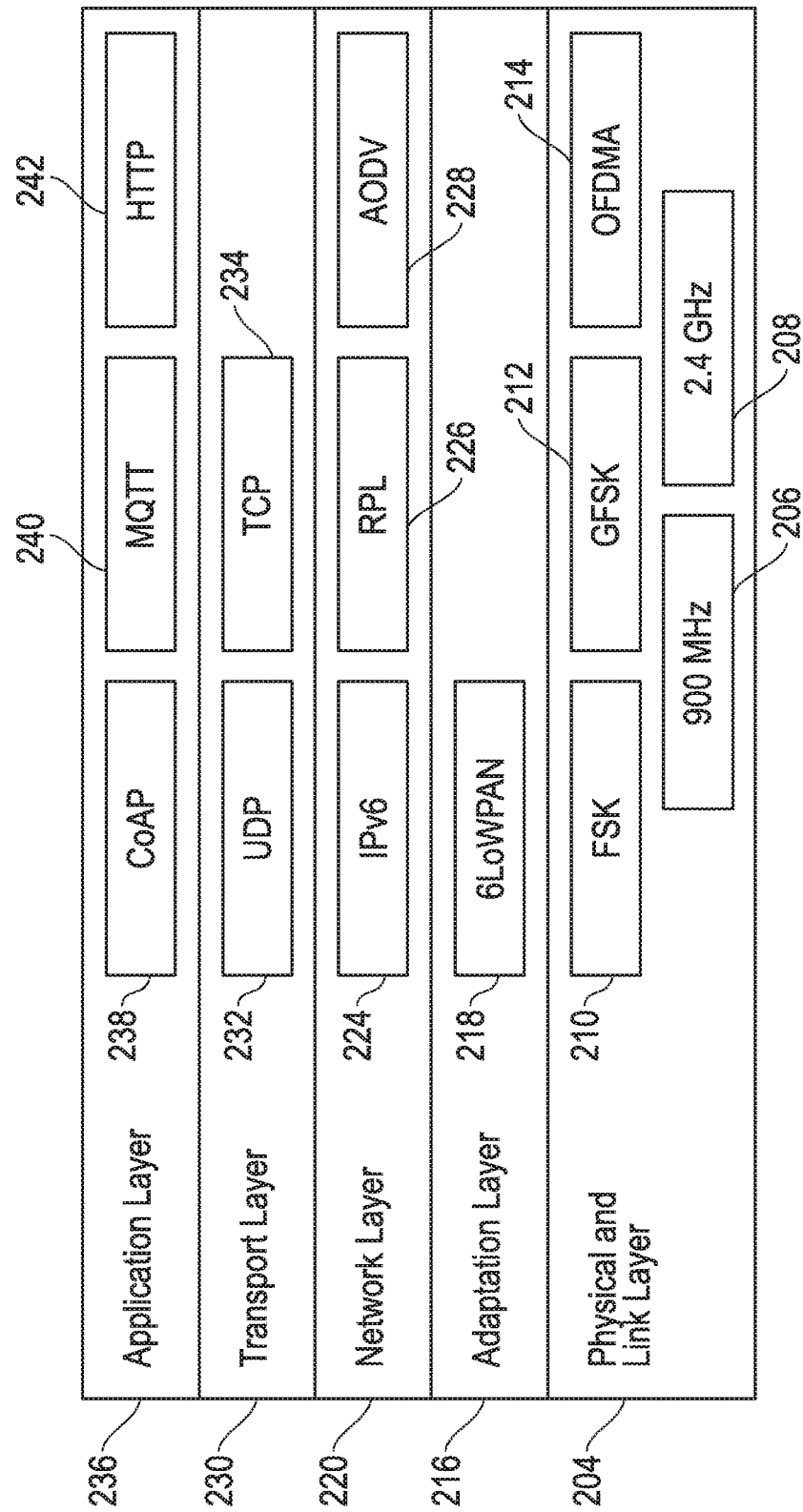
FIG. 2 is a block diagram illustrating a plurality of protocol variations at various layers that may interface with the multi-compatible 6LowPAN gateway system in an embodiment of the present disclosure.

FIG. 2 is a block diagram illustrating a plurality of protocols at the physical link layer, the network layer, the transport layer, and the application layer with which the multi-compatible 6LowPAN gateway system may be compatible in an embodiment of the present disclosure. Embodiments of the present disclosure solve compatibility problems between "ecosystems" of IoT devices and access points within an IEEE 802.15.4 network by providing a gateway wireless access point capable of receiving and transmitting data transmission packets on a plurality of radio frequencies from the bands used by the IEEE 802.15.4 networks, demodulating data packets according to a plurality of modulation schemes, and processing data packets through a plurality of real-time operating systems running within a higher layer operating system within the gateway device. Each real-time operating system in embodiments of the present disclosure may be capable of processing data packets generated according to one of a plurality of network protocols, a plurality of transport protocols, and one of a plurality of application protocols of the variations on the 6LoWPAN devices that may be interfaced with the gateway. By combining the functionality of each of these separate real-time operating systems, the wireless gateway access point operating the multi-compatible 6LowPAN gateway system may allow for compatibility between networked clients such as the IoT devices and wireless access points operating according to a plurality of physical layer, network layer, transport layer, and application layer protocols.

FIG. 2 illustrates the plurality of physical layer, network layer, transport layer, and application layer protocols with which the multi-compatible 6LowPAN gateway system may be compatible. For example, as shown in the physical and link layer 204 of FIG. 2, the multi-compatible 6LowPAN gateway system may be capable of receiving signals on a plurality of radio frequencies, including but not limited to 900 MHz 206 and 2.4 GHz 208. As described above, the information handling system executing instructions of the multi-compatible 6LowPAN gateway system may include a network interface device having one or more antenna systems, and one or more radio frequency subsystems that, in combination, may allow the multi-compatible 6LowPAN gateway system to receive signals on a plurality of radio frequencies. 900 MHz 206 and 2.4 GHz 208 are only examples of these plurality of radio frequencies and are not meant to be limiting. It is contemplated the network interface device operably connected to the multi-compatible 6LowPAN gateway system in embodiments may further be capable of receiving data packets transmitted on any number of radio frequencies, including but not limited to 2.4 GHz, 5 GHz, 868 MHz, 900 MHz, 925 MHz, and 2.45 GHz.

As also shown in the physical and link layer 204 of FIG. 2, the multi-compatible 6LowPAN gateway system in an embodiment may be capable of demodulating data packets modulated according to a plurality of modulation schemes. For example, as shown in FIG. 2, the multi-compatible 6LowPAN gateway system in an embodiment may be capable of demodulating data packets modulated according to the frequency-shift keying (FSK) 210, Gaussian frequency-shift keying (GFSK) 212, and/or the orthogonal frequency division multiplexing algorithm (OFDMA) 214 modulation schemes. Modulation schemes 210, 212, and 214 are only examples of the possible modulation schemes according to which data packets may have been modulated that the multi-compatible 6LowPAN gateway system may be capable of demodulating in embodiments of the present disclosure. Other modulation schemes are contemplated, including, but not limited to, the LoRa™ FSK modulation scheme.

As shown in the network layer 220 of FIG. 2, the multi-compatible 6LowPAN gateway system may be compatible with a plurality of network layer protocols in an embodiment. For example, as shown in the network layer 220, the multi-compatible 6LowPAN gateway system in an embodiment may be compatible with the Internet Protocol version 6 (IPv6) 224, the IPv6 Routing Protocol for Low-power and Lossy networks (RPL) 226, and Ad-hoc On demand Distance Vector routing protocol (AODV) 228. Network protocols 224, 226, and 228 are only examples of the possible network protocols to which data packets may conform that the multi-compatible 6LowPAN gateway system may be capable of processing in embodiments of the present disclosure and any other network protocols that may be used in combination with data packets adhering to the 6LoWPAN adaptation layer protocol are also contemplated.

Many current real-time operating systems, functioning alone, do not support each and every network layer protocol. For example, a Contiki RTOS, an Open WSN Free RTOS, and a Zephyr RTOS may be capable of processing data packets conforming to the IPv6 and RPL network protocols, but not the AODV protocol. As another example, a TinyOS RTOS may be capable of processing data packets conforming to the RPL and AODV network protocols, but not the IPv6 protocol. As yet another example, an mbed RTOS may be capable of only processing data packets conforming to the AODV network protocol. The multi-compatible 6LowPAN gateway system may provide compatibility for each of these network protocols in an embodiment by processing data packets conforming to each of these network protocols through operating one or more real-time operating systems (RTOSs) specifically designed to handle that specific network protocol and combining the functionality of several real-time operating systems to effectively process data packets conforming to all network protocols relevant to an IoT connected network, for example involving multiple various and distinct IoT protocols and interfacing with higher level wireless protocols for network connection to a cloud computing network, as described in greater detail below.

As shown in the transport layer 230 in FIG. 2, the multi-compatible 6LowPAN gateway system may be compatible with a plurality of transport layer protocols in an embodiment. For example, as shown in the transport layer 230, the multi-compatible 6LowPAN gateway system may be capable of processing data packets adhering to the Transmission Control Protocol (TCP) 234 or the User-Datagram Protocol (UDP) 232. Transport protocols 232 and 234 are only examples of the possible transport layer protocols to which data packets may conform that the multi-compatible 6LowPAN gateway system may be capable of processing in embodiments of the present disclosure and any other transport layer protocols that may be used in combination with data packets adhering to the 6LoWPAN adaptation layer protocol are also contemplated.

As shown in the application layer 236 in FIG. 2, the multi-compatible 6LowPAN gateway system may be compatible with a plurality of application layer protocols in an embodiment. For example, as shown in the application layer 236, the multi-compatible 6LowPAN gateway system in an embodiment may be capable of processing data payloads for use in a Constrained Application Protocol (CoAP) 238, a Message Queue Telemetry Transport protocol (MQTT) 240, and a HyperText Transfer Protocol (HTTP) 242.

Many current real-time operating systems, functioning alone, do not support each and every application layer protocol. For example, a TinyOS RTOS may be capable of processing data packets only conforming to the CoAP application protocol. As another example, a Zephyr RTOS and an mbed RTOS may be capable of processing data packets conforming to the CoAP, MQTT, and HTTP application protocols. The multi-compatible 6LowPAN gateway system may provide compatibility for each of these application protocols in an embodiment by processing the data packet according to a protothread code instruction, wherein each protothread code instruction corresponds to one of the application layer protocols, as described in greater detail below.

Figure 3:
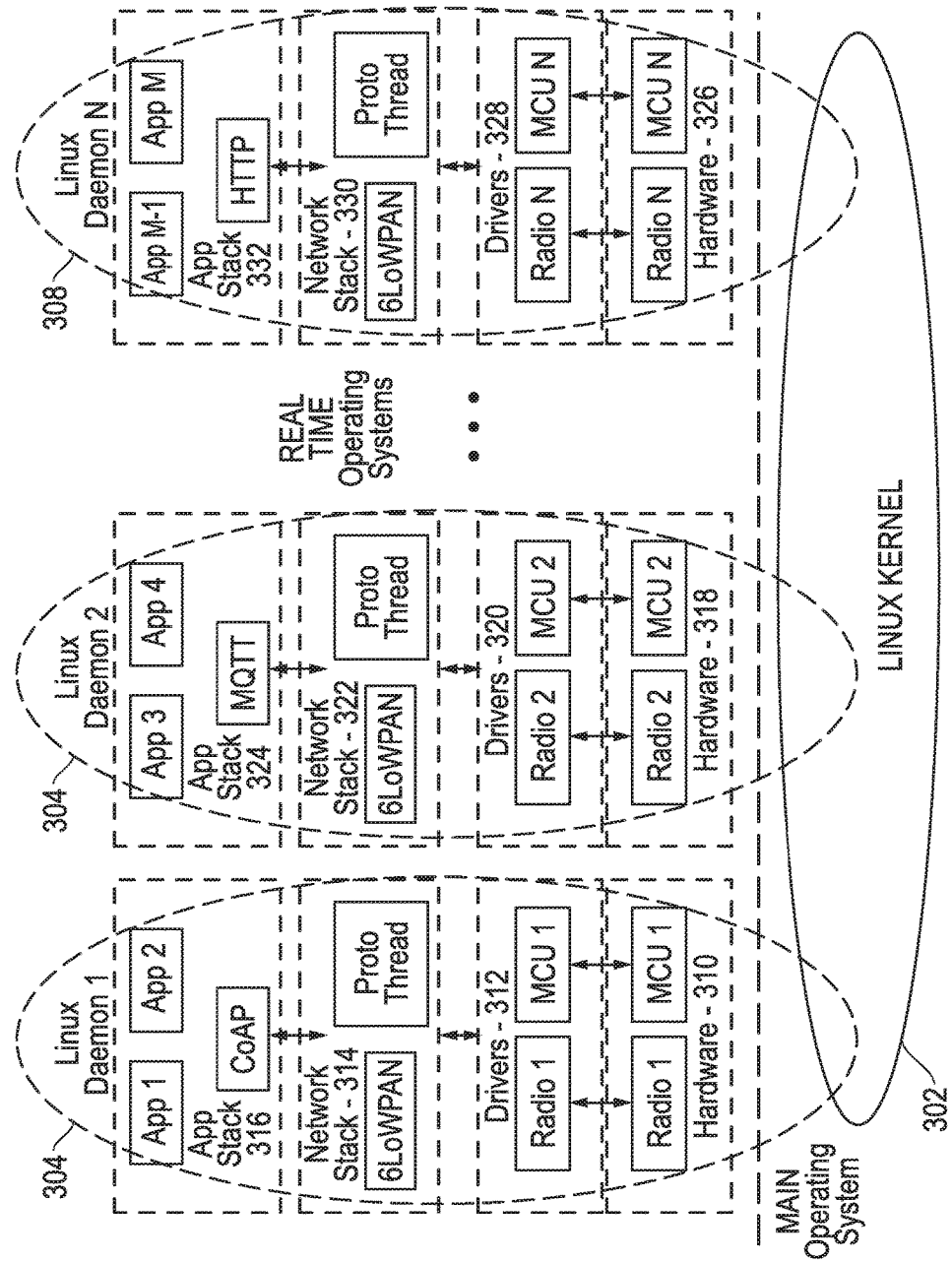
FIG. 3 is a block diagram illustrating a multi-compatible 6LowPAN gateway system according to an embodiment of the present disclosure.

FIG. 3 is a block diagram illustrating a high-level operating system operating a multi-compatible 6LoWPAN gateway system including a plurality of real-time operating systems according to an embodiment of the present disclosure. An information handling system operating a multi-compatible 6LoWPAN gateway system may include a high-level operating system directing operation of the network interface device, and the multi-compatible 6LowPAN gateway system. The multi-compatible 6LoWPAN gateway system may further include a single Linux kernel 302 operating within the main operating system to direct operations of a plurality of real time operating systems operating on top of the main operating system.

The plurality of real-time operating systems in an embodiment may operate as application platform interfaces, such as, for example, a Linux Daemon. As shown in FIG. 3, the multi-compatible 6LoWPAN gateway system in an embodiment may include Linux Daemon 1 302, Linux Daemon 2 306, and any number of other real-time operating systems, up to Linux Daemon N 308. Each Linux Daemon or real-time operating system in an embodiment may be capable of processing a data packet received on one of a plurality of radio frequencies, modulated according to one of a plurality of modulation schemes, and formatted according to one of a plurality of microcontroller architectures, one of a plurality of network protocols, one of a plurality of transportation protocols, and one of a plurality of application protocols. Each Linux Daemon in an embodiment may be capable of processing one of the possible combinations of each of these pluralities. The number of Linux Daemons present in an embodiment may thus correlate to the number of possible combinations of radio frequencies, modulation schemes, microprocessor architectures, network protocols, and application protocols available.

Each Linux Daemon in an embodiment may include hardware, drivers including code instructions that may operate the hardware, a network stack, and an application stack. For example, Linux Daemon 1 304 in an embodiment may include hardware 310, drivers 312, network stack 314, and application stack 316. As another example, Linux Daemon 2 306 in an embodiment may include hardware 318, drivers 320, network stack 322, and application stack 324. As yet another example, Linux Daemon N 308 in an embodiment may include hardware 326, drivers 328, network stack 330, and application stack 332.

Hardware included in each Linux Daemon in an embodiment may further include a transceiving radio and a microcontroller. Each transceiving radio in an embodiment may be capable of receiving transmissions on a different frequency, or different frequency band than other transceiving radios. In other words, by combining the functionality of all of the transceiving radios in an embodiment, the multi-compatible 6LoWPAN gateway system may be capable of receiving and transmitting transmissions on any radio frequency commonly used by 6LoWPAN devices.

In an embodiment, detection of an incoming transmission on a given frequency will automatically activate one or more of the plurality of radio transceivers capable of communicating on that given frequency in an embodiment to receive the transmission. For example, radio 1 located within hardware 310 of Linux Daemon 1 304 may be capable of receiving a transmission on a radio frequency of 900 MHz, and radio 2, within hardware 318 of Linux Daemon 2 306 may be capable of receiving a transmission on a radio frequency of 2.4 GHz. Upon detection of an incoming transmission on the 900 MHz frequency, radio 1 within hardware 310 of Linux Daemon 1 304 may automatically activate and receive the incoming transmission, while radio 2 within hardware 318 of Linux Daemon 2 306 may not activate to receive the transmission.

In an aspect of an embodiment, each Linux Daemon may operate in conjunction with a separate radio. For example, if such an embodiment included Linux Daemons numbered 1 to N, that embodiment may also include radios numbered 1 to N and each radio may serve only one Linux Daemons. In other aspects of an embodiment, each radio may serve a plurality of Linux Daemons. For example, in such an embodiment, one radio may receive transmissions on a frequency of 900 MHz, and may serve a subset of Linux Daemons, where each Linux Daemon in the subset provides a different combination of compatibility with respect to MCU architectures, network layer protocols, and application layer protocols.

Drivers included in each Linux Daemon in an embodiment may further include a transceiving radio driver and a microcontroller driver. The transceiving radio driver of a first Linux Daemon in an embodiment may modulate and demodulate data packets according to a differing modulation scheme than the modulation scheme according to which a radio driver on a second Linux Daemon may modulate or demodulate data packets. For example, in an embodiment, Linux Daemon 1 304 may include a radio 1 driver within drivers 312 which may modulate and demodulate data packets according to an FSK modulation scheme, while Linux Daemon 2 306 may include a radio 2 driver within drivers 320 which may modulate and demodulate data packets according to a GFSK modulation scheme, and Linux Daemon N 308 may include a radio N driver within drivers 328 which may modulate and demodulate data packets according to an OFDMA modulation scheme.

Upon receipt of a data transmission by one of the plurality of radios, as described above, the radio driver coupled with that receiving radio may demodulate the data transmission according to the modulation scheme identified in the physical link layer header of the transmission. In an embodiment in which each radio serves only one real-time operating system, multiple radios may receive the modulated data transmission simultaneously. For example, in an embodiment, radio 1 within hardware 310 of Linux Daemon 1 304, radio 2 within hardware 318 of Linux Daemon 2 306, and radio N within hardware 326 of Linux Daemon N 308 may each simultaneously receive a data transmission on a radio frequency of 900 MHz. In such an embodiment, radio driver 1 within drivers 312 of Linux Daemon 1 304 may be capable of demodulating transmissions according to the FSK modulation scheme, radio driver 2 within drivers 320 of Linux Daemon 2 306 may be capable of demodulating transmissions according to the GFSK modulation scheme, and radio driver N within drivers 328 of Linux Daemon N 308 may be capable of demodulating transmissions according to the OFDMA modulation scheme. Because the incoming transmission may only be modulated according to one of these schemes, only one of the radio drivers described directly above may be capable of demodulating the incoming transmission.

In another aspect of an embodiment, one radio may serve multiple real-time operating systems, and each of the multiple real-time operating systems served by the single radio may include different radio drivers, each capable of demodulating data transmissions according to a different modulations scheme. For example, radio 1 within hardware 310 of Linux Daemon 1 304 may also serve a third Linux Daemon (not shown). Radio 1 within hardware 310 of Linux Daemon 1 304 in such an embodiment may interface with radio driver 1 within drivers 312 of Linux Daemon 1 to demodulate data packets according to, for example, the FSK modulation scheme, while the radio driver within the third Linux Daemon (not shown), which is also coupled to Radio 1 may demodulate data packets according to, for example, the GFSK modulation scheme.

The combined functionality of all radio drivers of the Linux Daemons in a multi-compatible 6LoWPAN gateway system in an embodiment may make the multi-compatible 6LoWPAN gateway system, as a whole, capable of modulating and demodulating data packets according to any modulation schemes used by devices operating according to the 6LoWPAN protocol. Further, in an embodiment, the 6LoWPAN gateway system may include one Linux Daemon for every possible combination of radios and modulation schemes used by devices adhering to the 6LoWPAN protocol. For example, in an embodiment where 6LoWPAN devices may be capable of operating on a 900 MHz frequency or a 2.4 GHz frequency and may have radio drivers capable of modulating and demodulating packets according to one of three different modulation schemes, the multi-compatible 6LoWPAN gateway system in such an embodiment may include at least two different Linux Daemons (one for each radio frequency), and up to six different Linux Daemons (one for each of the six possible combinations of the two different radio frequencies and three different modulation schemes).

Once the data transmission has been demodulated (according to any of the possible embodiments described directly above), the radio in an embodiment may transmit the demodulated data packet to a processor for further processing via one of a plurality of GPIO lines. The choice of the GPIO line the radio uses to transmit the demodulated data packet to the processor may be dictated by the MCU architecture of the IoT device that transmitted the data packet to the multi-compatible 6LoWPAN gateway system in an embodiment. Upon receipt of the data packet, the processor may identify the GPIO line upon which it received the data packet, associate that GPIO line with a specific microcontroller architecture, and forward the data packet on to one or more microcontrollers within the multi-compatible 6LoWPAN gateway system having the same identified specific microcontroller architecture.

The microcontroller of a first Linux Daemon in an embodiment may have a differing architecture from a microcontroller of a second Linux Daemon. As an example, a microcontroller MCU 1 may operate Linux Daemon 1 304, and MCU 1 may have a differing architecture than either MCU 2 operating Linux Daemon 2 306 or MCU N operating Linux Daemon N 308. In addition, and as another example, MCU 2 operating Linux Daemon 2 306 may have a different architecture than MCU N operating Linux Daemon N 308. In an embodiment, the combined functionality of all MCUs of the Linux Daemons in a multi-compatible 6LoWPAN gateway system may make the multi-compatible 6LoWPAN gateway system, as a whole, capable of processing data packets received from access points having microcontrollers with any architecture used to operate devices or operating systems operating according to the 6LoWPAN protocol.

In some embodiments, the multi-compatible 6LoWPAN gateway system may include one Linux Daemon for every possible combination of radios, modulation schemes, and MCUs used by devices adhering to the 6LoWPAN protocol. For example, in an embodiment where 6LoWPAN devices may be capable of operating on a 900 MHz frequency or a 2.4 GHz frequency, may be modulated according to FSK, GFSK, or OFDMA, and may have one of three different architectures, the multi-compatible 6LoWPAN gateway system in such an embodiment may include at least three different real-time operating systems (one for each microcontroller), or as many as eighteen different real-time operating systems (one for each possible combination of the two radio frequencies, three modulations schemes, and three microcontroller architectures available).

In an aspect of an embodiment, the multi-compatible 6LoWPAN gateway system may include only one microcontroller for each of the available microcontroller architectures. Further, in such an embodiment, each microcontroller may serve a plurality of real-time operating systems. For example, in such an embodiment, the processor may receive a demodulated data packet via a first GPIO line, associate the first GPIO line with a first MCU architecture, identify that MCU 1 of Linux Daemon 1 304 uses the identified first MCU architecture, and forward the data packet on to MCU1 within hardware 310 of Linux Daemon 1 304. Further, in such an embodiment, MCU 1 may serve Linux Daemon 1 304, and may also serve a third Linux Daemon (not shown). Each real-time operating system served by an individual microcontroller in such an embodiment may provide differing compatibility with respect to network layer protocols, and application layer protocols.

In another aspect of an embodiment, the multi-compatible 6LoWPAN gateway system may include a plurality of microcontrollers having the same architecture as one another. For example, in such an embodiment, MCU1 within hardware 310 of Linux Daemon 1 304 may adhere to a first microcontroller architecture, and MCU2 within hardware 318 of Linux Daemon 2 306 may also adhere to the first microcontroller architecture. In such an embodiment, Linux Daemon 1 304 may be capable of routing data packets according to a first network protocol, and Linux Daemon 2 306 may be capable of routing data packets according to a second network protocol.

Since each data packet may be formatted according to only one network layer protocol, only one of these two Linux Daemons in such an embodiment may be capable of routing the data packet. By running these two Linux Daemons simultaneously in an embodiment, one of the Linux Daemons may properly route the data packet promptly upon demodulation of the transmission. In both of the embodiments described directly above, the microcontroller may transmit the received, demodulated data packet to the network stack within the same real-time operating system as the microcontroller. For example, in an embodiment where MCU 1 serves Linux Daemon 1 304 and a third Linux Daemon (not shown), MCU 1 may forward the demodulated data packet to network stack 314 within Linux Daemon 1 304, and may simultaneously forward the demodulated data packet to a network stack (not shown) within the third Linux Daemon (not shown). As another example, in an embodiment where MCU 1 of Linux Daemon 1 304 has the same architecture as MCU 2 of Linux Daemon 2, MCU 1 and MCU 2 may have simultaneously received the same demodulated data packet, and MCU 1 may forward the data packet on to network stack 314 of Linux Daemon 1 304, while MCU 2 simultaneously forwards the data packet on to network stack 322 of Linux Daemon 2 306. Network stack 314, network stack 322, and the network stack of the third Linux Daemon (not shown) in such embodiments may be capable of routing data packets according to a different network protocol.

Network stacks included in each Linux Daemon in an embodiment may further include a 6LoWPAN stack and a protothread stack. The 6LoWPAN network stack of each Linux Daemon in an embodiment may operate to piece together multiple data packets sent according to the 6LoWPAN protocol into a single data packet adhering to the IPv6 protocol, the RPL protocol, or the AODV protocol. The network stack in each Linux Daemon in an embodiment may operate to route data packets according to one of a plurality of network protocols available to devices operating within a 6LoWPAN network. For example, network stack 314 in Linux Daemon 1 304 may operate to route data packets according to the IPv6 network protocol, network stack 322 in Linux Daemon 2 306 may operate to route data packets according to the RPL network protocol, and network stack 330 in Linux Daemon N 308 may operate to route data packets according to the AODV network protocol.

The combined functionality of all network stacks of the Linux Daemons in a multi-compatible 6LoWPAN gateway system in an embodiment may make the multi-compatible 6LoWPAN gateway system, as a whole, capable of processing data packets adhering to any of the network protocols available to devices operating within a 6LoWPAN network. In some embodiments, the multi-compatible 6LoWPAN gateway system may include one Linux Daemon for every possible combination of radios, modulation schemes, MCUs, and network layer protocols used by devices adhering to the 6LoWPAN protocol. For example, in an embodiment where 6LoWPAN devices may be capable of operating on a 900 MHz frequency or a 2.4 GHz frequency, may be modulated according to FSK, GFSK, or OFDMA, may have one of three different architectures, and may route data packets according to the IPv6, RPL, or AODV network protocols, the multi-compatible 6LoWPAN gateway system in such an embodiment may include at least nine different real-time operating systems (one for each combination of available microcontrollers and available network layer protocols), or as many as fifty-four different real-time operating systems (one for each possible combination of the two radio frequencies, three modulations schemes, three microcontroller architectures, and three network layer protocols available).

As described above, a plurality of network stacks in an embodiment may receive the same data packet simultaneously. In an aspect of such an embodiment, only one of the plurality network stacks that have received the data packet may be capable of routing the data packet, because only one of the network stacks may be capable of routing data packets adhering to the network protocol identified in the network layer header of the data packet. For example, in an embodiment where network stack 314 of Linux Daemon 1 304 is capable of routing data packets according to the IPv6 network protocol, network stack 322 of Linux Daemon 2 306 is capable of routing data packets according to the RPL network protocol, and Linux Daemon N 308 is capable of routing data packets according to the AODV network protocol, only Linux Daemon 1 304 will be capable of routing a data packet formatted according to the IPv6 network protocol, despite the fact that the same data packet was transmitted to network stack 322 of Linux Daemon 2 306 and network stack 330 of Linux Daemon N 308 at the same time it was transmitted to network stack 314 of Linux Daemon 1 304.

In another aspect of an embodiment, a plurality of network stacks that have received the data packet may be capable of routing the data packet, because a plurality of network stacks may be capable of routing data packets according to the same network protocol. For example, in an embodiment where network stack 314 of Linux Daemon 1 304 is capable of routing data packets according to the RPL network protocol, and network stack 322 of Linux Daemon 2 306 is also capable of routing data packets according to the RPL network protocol, both network stack 314 of Linux Daemon 1 304 and network stack 322 of Linux Daemon 2 306 may be capable of simultaneously routing the same data packet.

In either embodiment described directly above, the network stack that is capable of routing the data packet according to the network protocol identified in the network layer header of the data packet may route the data packet according to the identified network protocol and forward the data packet on to an application stack of the same real-time operating system. For example, in an embodiment where only Linux Daemon 1 304 is capable of routing a data packet according to the network protocol identified in the data packet network layer header, the network stack 314 of Linux Daemon 1 304 may forward the data packet on to the application stack 316 for further processing within Linux Daemon 1 304. In another example, in an embodiment where Linux Daemon 1 304 and Linux Daemon 2 306 are both capable of routing a data packet according to the network protocol identified in the data packet network layer header, the netword stack 314 of Linux Daemon 1 304 may forward the data packet on to the application stack 316 within Linux Daemon 1 304, and network stack 322 of Linux Daemon 2 306 may simultaneously forward the data packet on to the application stack 324 of Linux Daemon 2 306. In such an example embodiment, application stack 316 of Linux Daemon 1 304 may be capable of processing data packets according to a first application layer protocol, while application stack 324 of Linux Daemon 2 306 may be capable of processing data packets according to a second application layer protocol.

Application stacks included in each Linux Daemon in an embodiment may further include one or more application stacks where each of the applications adheres to one of a plurality of application protocols. The 6LoWPAN network stack of each Linux Daemon in an embodiment may operate to process the data payload of the received data packet, including, but not limited to, saving the data payload to a main memory accessible by all Linux Daemons. For example, Linux Daemon 1 304 in an embodiment may include an application stack 316 that processes data payloads via application 1 or application 2, both of which adhere to the CoAP application protocol. As another example, Linux Daemon 2 306 in an embodiment may include an application stack 324 that processes data payloads via application 3 or application 4, both of which adhere to the MQTT application protocol. As yet another example, Linux Daemon N 308 in an embodiment may include an application stack 332 that processes data payloads via application M−1 or application M, both of which adhere to the HTTP application protocol.

The combined functionality of all application stacks 316, 324, and 332 of the Linux Daemons 1, 2, and N in a multi-compatible 6LoWPAN gateway system in an embodiment may make the multi-compatible 6LoWPAN gateway system, as a whole, capable of processing data payloads in applications operating according to any application protocol available to devices operating within a 6LoWPAN network. In some embodiments, the multi-compatible 6LoWPAN gateway system may include one Linux Daemon for every possible combination of radios, modulation schemes, MCUs, network layer protocols, and application layer protocols used by devices adhering to the 6LoWPAN protocol. For example, in an embodiment where 6LoWPAN devices may be capable of operating on a 900 MHz frequency or a 2.4 GHz frequency, may be modulated according to FSK, GFSK, or OFDMA, may have one of three different architectures, may route data packets according to the IPv6, RPL, or AODV network protocols, and may process data payloads according to the CoAP, MQTT, or HTTP application layer protocols, the multi-compatible 6LoWPAN gateway system in such an embodiment may include at least twenty-seven different real-time operating systems (one for each combination of available microcontrollers, available network layer protocols, and available application layer protocols), or as many as 162 different real-time operating systems (one for each possible combination of the two radio frequencies, three modulations schemes, three microcontroller architectures, three network layer protocols, and three application layer protocols available). In such a way, embodiments of the present disclosure may solve compatibility problems between "ecosystems" of access points within an IEEE 802.15.4 network by providing a gateway wireless access point capable of receiving and transmitting data transmission packets on a plurality of radio frequencies from the bands used by both Wi-Fi and IEEE 802.15.4 networks, demodulating data packets according to a plurality of modulation schemes, and processing data packets through a plurality of real-time operating systems running within a higher layer operating system within the gateway device.

As described above, a plurality of application stacks in an embodiment may receive the same data packet simultaneously. In an aspect of such an embodiment, only one of the plurality application stacks that have received the data packet may be capable of processing the data payload within the data packet, because only one of the application stacks may be capable of processing data payloads adhering to the application protocol identified in the application layer header of the data packet. For example, in an embodiment where application stack 316 of Linux Daemon 1 304 is capable of processing data payloads according to the CoAP application protocol, application stack 324 of Linux Daemon 2 306 is capable of processing data payloads according to the MQTT application protocol, and application stack 332 of Linux Daemon N 308 is capable of processing data payloads according to the HTTP application protocol, only Linux Daemon 1 304 will be capable of processing data payloads formatted according to the CoA application protocol, despite the fact that the same data packet was transmitted to application stack 324 of Linux Daemon 2 306 and application stack 322 of Linux Daemon N 308 at the same time it was transmitted to application stack 316 of Linux Daemon 1 304.

Figure 4:
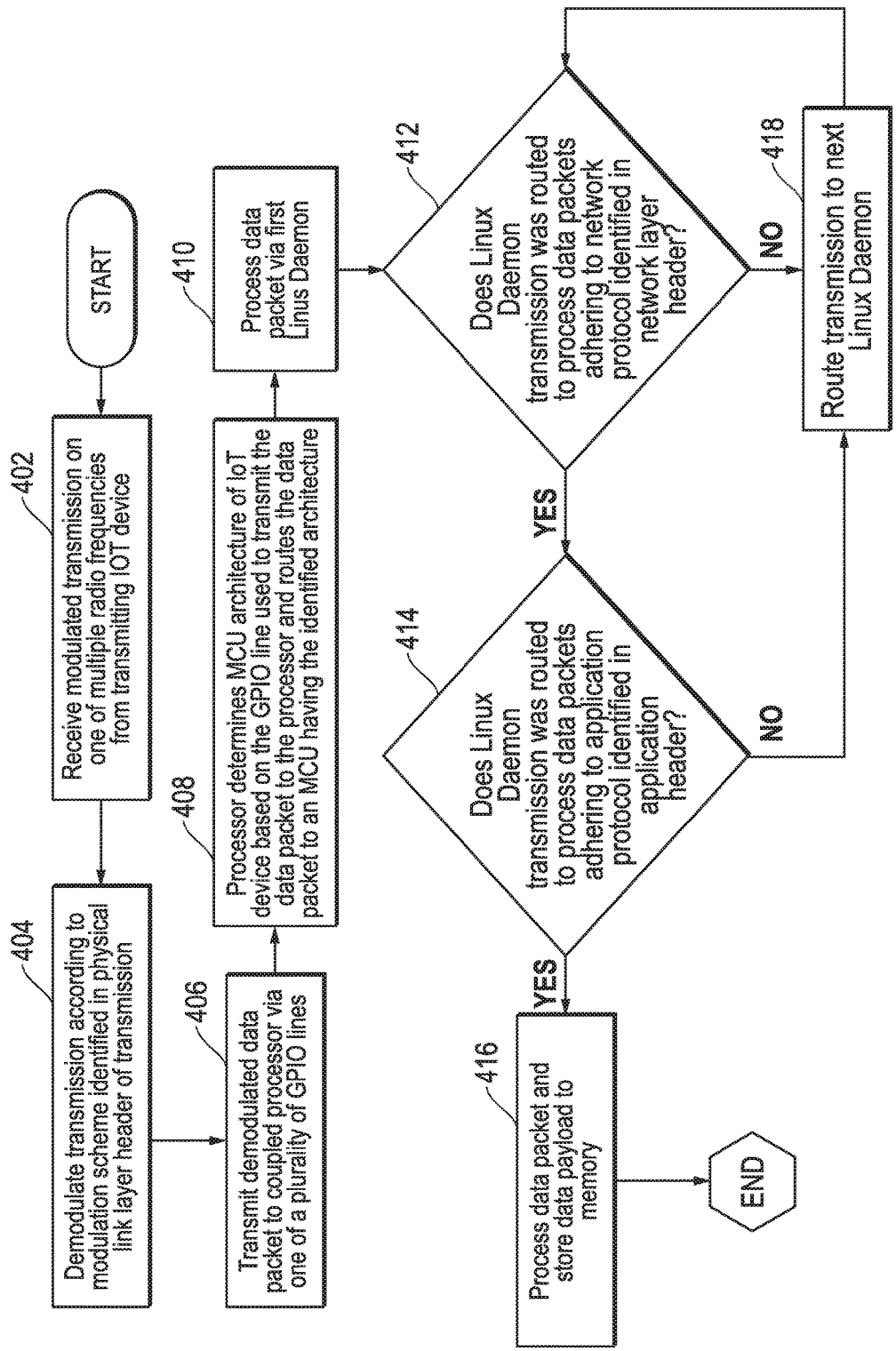
FIG. 4 is a flowchart illustrating a method for processing a data packet through one of a plurality of real-time operating systems according to an embodiment of the present disclosure.

FIG. 4 is a flowchart illustrating a method for processing a data packet received via one of a plurality of radio frequencies, modulated according to one of a plurality of modulation schemes, and formatted according to one of a plurality of network protocols and one of a plurality of application protocols through one of a plurality of real-time operating systems according to an embodiment of the present disclosure. As shown in FIG. 4, at block 402, a plurality of real-time operating systems may simultaneously receive a modulated transmission one of multiple radio frequencies from a transmitting IoT device. Upon detection of an incoming signal on a given frequency or given frequency band in an embodiment, a multi-compatible 6LoWPAN gateway system may simultaneously activate one or more radios capable of receiving transmissions on the given frequency or within the given frequency band. For example, a multi-compatible 6LoWPAN gateway system in an embodiment may include one or more radios capable of receiving transmissions on a 900 MHz frequency, and one or more radios capable of receiving transmissions on a 2.4 GHz frequency. Upon detection of an incoming signal on the 900 MHz frequency, the one or more radios capable of receiving transmissions on the 900 MHz frequency may automatically activate to receive the incoming signal, while the radios functioning on the 2.4 GHz frequency do not activate.

At block 404, in an embodiment, each of the one or more radios that activated to receive the radio signal in block 402 may attempt to demodulate the received transmission according to one of a plurality of modulation schemes. Each radio in an embodiment may be associated with one or more radio drivers, and each radio driver may be capable of demodulating transmissions according to a different modulations scheme. For example, in an embodiment where multiple radios receive the 900 MHz transmission, as described at block 402, each radio may be coupled with a separate radio driver. As another example, in an embodiment where only one radio receives the 900 MHz transmission, as also described at block 402, the single receiving radio may be coupled with a plurality of radio drivers. In either of these embodiments, one radio driver may be capable of demodulating transmissions modulated according to the FSK modulation scheme, one radio driver may be capable of demodulating transmissions modulated according to the GFSK modulation scheme, and one radio driver may be capable of demodulating transmissions modulated according to the OFDMA modulation scheme. In the embodiment where multiple radios, each coupled with a separate radio driver receive the 900 MHz transmission, only the radio coupled to the radio driver capable of demodulating the data transmission according to the modulation scheme identified in the physical link layer header of the data transmission will successfully demodulate the transmission. In the embodiment where only one radio coupled with a plurality of radio drivers receives the 900 MHz transmission, the radio may simultaneously call all of the plurality of radio drivers to demodulate the signal, and one of the radio drivers coupled with the receiving radio will successfully demodulate the signal.

At block 406, in an embodiment, the receiving radio that successfully demodulated the transmission at block 404 may transmit the demodulated data packet to a coupled processor via one of a plurality of GPIO lines. Each of the plurality of radios within a multi-compatible 6LoWPAN gateway system in an embodiment may be operatively connected to a single processor via a plurality of GPIO lines. Each GPIO line may be associated with one of a plurality of MCU architectures. The radio that successfully demodulates an incoming transmission may transmit the demodulated data packet on the GPIO line associated with the MCU architecture employed by the IoT device that transmitted the data packet.

At block 408, in an embodiment, the processor that receives the data packet transmitted at block 406 may identify the MCU architecture associated with the GPIO line upon which it received the data transmission and route the data packet to a first MCU having the identified MCU architecture associated with that GPIO line. As described above, the multi-compatible 6LoWPAN gateway system in an embodiment may include one MCU adhering to each of the available MCU architectures used in 6LoWPAN devices, or it may include a plurality of MCUs that each adhere to one of the available MCU architectures available. In the former embodiment, the processor may route the data packet to the one MCU adhering to the architecture identified based on the GPIO line used to receive the data packet, and the one MCU may be associated with a plurality of real-time operating systems or Linux Daemons. In the latter embodiment described above, multiple MCUs may receive the demodulated data packet simultaneously at block 408. In such an embodiment, each MCU may be associated with one or more Linux Daemons.

At block 410, in an embodiment each MCU in receipt of the data packet may process the data packet via a first Linux Daemon with which it is associated. For example, in an embodiment where a single MCU associated with a plurality of Linux Daemons receives the data packet, the single MCU at block 410 may attempt to process the data packet via the first of the plurality of Linux Daemons with which it is associated. The MCU may sequentially or in parallel process other Linux Daemons as described. As another example, and in an alternate embodiment, the single MCU at block 410 may attempt to process the data packet simultaneously via each of the plurality of Linux Daemons with which it is associated. Each Linux Daemon may contain instructions to operate compatibly with a variety of MCU architecture types used with 6LoWPAN devices interfacing with an access point. As yet another example, and in another embodiment where a plurality of MCUs, each associated with one or more Linux Daemons simultaneously receive the data packet, each of the plurality of MCUs at block 410 may simultaneously attempt to process the data packet via one or more of the Linux Daemons with which they are each associated. In each of the above examples, the data packet being processed by the one or more Linux Daemons may be transmitted to one network stack within each of the Linux Daemons. Each network stack in an embodiment may operate according to one of a plurality of network layer protocols available to 6LoWPAN devices.

At block 412, it may be determined whether the Linux Daemon processing the data packet operates in accordance with the network layer protocol identified within the network layer header of the data packet. In an example embodiment where only one Linux Daemon is processing the data packet, if that Linux Daemon does not process data packets according to the network layer protocol identified in the network layer header of the data packet, the method may proceed to block 418. In an example embodiment where multiple Linux Daemons are processing the data packet simultaneously, a Linux Daemon that does not process data packets according to the network layer protocol identified in the network layer header of the data packet may simply stop work on the received data packet, and the method may not proceed to block 418.

In this latter example embodiment, the method may stop with respect to the Linux Daemon that does not process data packets according to the network layer protocol identified in the network layer header of the data packet because it is assumed one or more of the plurality of Linux Daemons simultaneously processing the data packet will be capable of routing data packets according to the network layer protocol identified in the network layer header of the data packet. Once one or more Linux Daemons processing the data packet successfully route the data packet according to the network layer protocol identified in the network layer header of the data packet, the network stacks that successfully routed the data packet may transmit the data packet onto one or more application stacks for further processing, and the method may proceed to block 414.

At block 414, in an embodiment, it may be determined whether the Linux Daemon processing the data packet operates in accordance with the application layer protocol identified within the application layer header of the data packet. In an example embodiment where only one Linux Daemon is processing the data packet, if that Linux Daemon does not process data packets according to the application layer protocol identified in the application layer header of the data packet, the method may proceed to block 418. In an example embodiment where multiple Linux Daemons are processing the data packet simultaneously, a Linux Daemon that does not process data packets according to the application layer protocol identified in the application layer header of the data packet may simply stop work on the received data packet, and the method may not proceed to block 418 for that Linux Daemon amongst the plurality.

In this latter example embodiment, the method may stop with respect to the Linux Daemon that does not process data packets according to the application layer protocol identified in the application layer header of the data packet because it is assumed one or more of the plurality of Linux Daemons simultaneously processing the data packet will be capable of processing data packets according to the application layer protocol identified in the application layer header of the data packet. Once one or more Linux Daemons processing the data packet successfully process the data packet according to the application layer protocol identified in the application layer header of the data packet, the method may proceed to block 416.

At block 416, in an embodiment the data packet may be processed and the data payload may be stored to memory. In an example, a buffer memory may be used. In an embodiment where one or more Linux Daemons capable of routing a data packet according to the network layer protocol identified in that data packet's network layer header and capable of processing a data packet according to the application layer protocol identified in that data packet's application layer receives that data packet, the one or more Linux Daemons with such capabilities will be further capable of accessing the data payload of the data packet. Any Linux Daemons in receipt of the same data packet that are not capable of routing a data packet according to the network layer protocol identified in that data packets network layer header or are not capable of processing a data packet according to the application layer protocol identified in that data packet's application layer will not be capable of accessing that data packet's payload.

In some embodiments, the one or more Linux Daemons capable of accessing the data packet's payload may store the data payload to a memory accessible by all other Linux Daemons operating within the multi-compatible 6LoWPAN gateway device. Other Linux Daemons, having different network protocol capabilities, and/or different application protocol capabilities than the Linux Daemon that stored the payload in the memory may be capable of retrieving that payload from the common memory, and repackaging the payload into a different data packet adhering to a different application protocol, network protocol, MCU architecture, and/or different modulation scheme than the application protocol, network protocol, MCU architecture, and/or modulation scheme of the data packet received within the transmission at block 402.

In other embodiments, the one or more Linux Daemons capable of accessing the data packet's payload may not store the data payload to the common memory, but may repackage the data payload into another data packet for delivery to another application, another network node, or another MAC address than the data packet received in the data transmission at block 402.

At block 418, in an embodiment where a single Linux Daemon is processing a received data packet at one time, if it is determined the Linux Daemon currently processing the received data packet cannot route data packets according to the network protocol identified in the network layer header of the data packet, or it cannot process data packets according to the application protocol identified in the application layer header of the data packet, the data packet may be routed to the a next Linux Daemon. As described above at block 410, in one example embodiment, the demodulated data packet may be sent to one MCU, and that MCU may be associated with a plurality of Linux Daemons. In such an embodiment, at block 410, that single MCU may attempt to process that data packet via a first one of the plurality of Linux Daemons associated with that MCU. If it is determined at either block 412 or 414 that the first one of the plurality of Linux Daemons cannot process the data packet, as described directly above, the MCU may attempt to process the data packet via a second one of the plurality of Linux Daemons associated with that MCU. The MCU in an embodiment may thus repeat this cycle of blocks 412, 414, and 418 until one of the plurality of Linux Daemons associated with the MCU successfully processes the data packet and the method proceeds to block 416. In such a way, embodiments of the present disclosure may solve compatibility problems between "ecosystems" of access points within an IEEE 802.15.4 network by providing a gateway wireless access point capable of receiving and transmitting data transmission packets on a plurality of radio frequencies from the bands used by both Wi-Fi and IEEE 802.15.4 networks, demodulating data packets according to a plurality of modulation schemes, and processing data packets through a plurality of real-time operating systems running within a higher layer operating system within the gateway device.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system operating as a first network 6LoWPAN gateway access point comprising:
   a wireless adapter for receiving transmissions from a plurality of 6LoWPAN transmitting devices, wherein the received transmission may be on one of a plurality of radio frequencies, and wherein a received transmission includes a data packet modulated according to one of a plurality of modulation schemes;
   a processor executing code instructions of a plurality of real-time operating systems on a platform kernel;
   the wireless adapter to route an incoming transmission to the plurality of real-time operating systems compatible with the received radio frequency and the received modulation scheme;
   the processor to:
   select a first real-time operating system from the plurality of real-time operating systems which is capable of routing data packets according to a network protocol layer identified in a network header of the data packet and of processing data packets according to an application protocol layer identified in an application header of the data packet;

wherein the network protocol layer identified in the network header is one of a plurality of network layer protocols the selected first real-time operating system may accommodate; and route and process the received data packet via the selected first real-time operating system, wherein the plurality of real-time operating systems on the kernel may accommodate a plurality of combinations of transmission frequencies, modulation schemes, and application layer protocols identified for variations of the 6LoWPAN transmitting devices.

2. The system of claim 1 wherein the selection of the first real-time operating system is made based on the which real-time operating system from the plurality of real-time operating systems accommodates the incoming transmission packet from a 6LoWPAN transmitting device completely through all layers.

3. The system of claim 2 further comprising:
the processor processing the incoming data packet according to the application layer protocol identified in the application header of the data packet if the first real-time operating system is capable of routing data packets according to the network layer protocol identified in the network header of the data packet.

4. The system of claim 1, wherein the plurality of network layer protocols comprises internet protocol version 6, internet protocol version 6 for low-power and lossy networks, and ad-hoc on demand distance vector protocol.

5. The system of claim 1, wherein the plurality of transmission layer protocols comprises transmission control protocol and user datagram protocol.

6. The system of claim 1, wherein the plurality of application layer protocols comprises message cue telemetry transport, CoAPP, and hypertext transfer protocol.

7. The system of claim 1, wherein the first wireless adapter includes a plurality of wireless adapters capable of communicating on 900 MHz or 2.4 GHz frequencies and capable of demodulating the incoming transmission according to a plurality of modulation schemes.

8. A method of compatible communication between a plurality of access points and a gateway access point in a 6LoWPAN network comprising:

receiving an incoming transmission from one of a plurality of 6LoWPAN transmitting devices, wherein the incoming transmission may be on one of a plurality of radio frequencies, and wherein the incoming transmission includes a data packet modulated according to one of a plurality of modulation schemes;

routing an incoming transmission to a plurality of real-time operating systems operating on a platform kernel and compatible with the received radio frequency and the received modulation scheme;

selecting, via a controller executing code instruction, a first real-time operating system from the plurality of real-time operating systems which is capable of routing data packets according to a network protocol layer identified in a network header of the data packet and capable of processing data packets according to an application protocol layer identified in an application header of the data packet;

wherein the network protocol layer identified in the network header is one of a plurality of network layer protocols the selected first real-time operating system may accommodate; and routing and processing the data packet via the selected first real-time operating system, wherein the plurality of real-time operating systems on the kernel may accommodate a plurality of combinations of transmission frequencies, modulation schemes, and application layer protocols identified for variations of the 6LoWPAN transmitting devices.

9. The method of compatible communication between a plurality of access points and a gateway access point in a 6LoWPAN network of claim 8, wherein the selection of the first real-time operating system is made based on the which real-time operating system from the plurality of real-time operating systems accommodates the incoming transmission packet from a 6LoWPAN transmitting device through all layers.

10. The method of compatible communication between a plurality of access points and a gateway access point in a 6LoWPAN network of claim 9 further comprising:

processing the incoming data packet according to the application layer protocol identified in the application header of the data packet if the first real-time operating system is capable of routing data packets according to the network layer protocol identified in the network header of the data packet.

11. The method of compatible communication between a plurality of access points and a gateway access point in a 6LoWPAN network of claim 8, wherein the plurality of network layer protocols comprises internet protocol version 6, internet protocol version 6 for low-power and lossy networks, and ad-hoc on demand distance vector protocol.

12. The method of compatible communication between a plurality of access points and a gateway access point in a 6LoWPAN network of claim 8, wherein the plurality of transmission layer protocols comprises transmission control protocol and user datagram protocol.

13. The method of compatible communication between a plurality of access points and a gateway access point in a 6LoWPAN network of claim 8, wherein the plurality of application layer protocols comprises message cue telemetry transport, CoAPP, and hypertext transfer protocol.

14. The method of compatible communication between a plurality of access points and a gateway access point in a 6LoWPAN network of claim 8, wherein the first wireless adapter includes a plurality of wireless adapters capable of communicating on 900 MHz or 2.4 GHz frequencies and capable of demodulating the incoming transmission according to a plurality of modulation schemes.

15. An information handling system operating as a first network 6LoWPAN gateway access point comprising:

a wireless adapter for receiving transmissions from a plurality of 6LoWPAN transmitting devices, wherein the received transmission may be on one of a plurality of radio frequencies, and wherein a received transmission includes a data packet modulated according to one of a plurality of modulation schemes;

a processor executing code instructions of a plurality of real-time operating systems on a platform kernel;

the wireless adapter to route an incoming transmission from a first 6LoWPAN transmitting device to the plurality of real-time operating systems compatible with the received radio frequency and the received modulation scheme;

the processor to:

select a first real-time operating system from the plurality of real-time operating systems which is capable of routing data packets according to a network protocol layer identified in a network header of the data packet and of processing data packets according to an application protocol layer identified in an application header of the data packet;

wherein the network protocol layer identified in the network header is one of a plurality of network layer protocols the selected first real-time operating system may accommodate;

wherein the selection of the first real-time operating system is based on which real-time operating system from the plurality of real-time operating systems accommodates the incoming transmission packet from the first 6LoWPAN transmitting device through all layers; and route and process the received data packet via the selected first real-time operating system, wherein the plurality of real-time operating systems on the kernel may accommodate a plurality of combinations of transmission frequencies, modulation schemes, and application layer protocols identified for variations of the plurality of 6LoWPAN transmitting devices.

16. The system of claim 15 further comprising:
the processor processing the incoming data packet according to the application layer protocol identified in the application header of the data packet if the first real-time operating system is capable of routing data packets according to the network layer protocol identified in the network header of the data packet.

17. The system of claim 15, wherein the plurality of network layer protocols comprises internet protocol version 6, internet protocol version 6 for low-power and lossy networks, and ad-hoc on demand distance vector protocol.

18. The system of claim 15, wherein the plurality of transmission layer protocols comprises transmission control protocol and user datagram protocol.

19. The system of claim 15, wherein the plurality of application layer protocols comprises message cue telemetry transport, CoAPP, and hypertext transfer protocol.

20. The system of claim 15 further comprising:
the wireless adapter to route an incoming transmission from a second 6LoWPAN transmitting device to the plurality of real time operating systems;

and processor selecting a second real time operating system form the plurality of real time operating systems based on which real-time operating system from the plurality of real-time operating systems accommodates the incoming transmission packet from the second 6LoWPAN transmitting device through all layers.

* * * * *